United States Patent [19]

Yasuda et al.

[11] Patent Number: 4,803,406
[45] Date of Patent: Feb. 7, 1989

[54] HIGH-PRESSURE DISCHARGE LAMP OPERATING CIRCUIT

[75] Inventors: Makoto Yasuda, Kodaira; Tsune Miyashita, Tokyo; Seiichi Murayama, Kokubunji; Yoji Arai, Ome; Fuzio Yamada, Katsuta, all of Japan

[73] Assignee: Hitachi, Ltd., Tokyo, Japan

[21] Appl. No.: 795,268

[22] Filed: Nov. 5, 1985

[30] Foreign Application Priority Data

Nov. 5, 1984 [JP] Japan ................................. 59-231413

[51] Int. Cl.[4] .............................................. H05B 37/00
[52] U.S. Cl. ......................................... 315/174; 315/86; 315/175; 315/DIG. 7
[58] Field of Search ......... 315/174, 175, 205, DIG. 7, 315/151, 102, 105

[56] References Cited

U.S. PATENT DOCUMENTS

| 3,700,960 | 10/1972 | Lake ..................... 315/151 |
| 4,107,579 | 8/1978 | Bodine, Jr. et al. ................. 315/205 |
| 4,151,445 | 4/1979 | Davenport et al. .................... 315/87 |
| 4,587,460 | 5/1986 | Murayama et al. ................. 315/174 |

Primary Examiner—David K. Moore
Assistant Examiner—Theodore Salindong
Attorney, Agent, or Firm—Antonelli, Terry & Wands

[57] ABSTRACT

A high-pressure discharge lamp operating circuit performs a low-frequency AC operating at an early stage of operating and thereafter performs a high-frequency AC operation or DC operation during the steady-state of lamp operation. This circuit comprises a circuit for effecting a transition from the low-frequency AC operation to the high-frequency AC operation or DC operation either at the time which is a predetermined time period after the ignition of discharge before the high-pressure discharge lamp reaches the steady-state of operation, or after having detected at least one of predetermined lamp characteristics, thereby providing a stabilized light output.

15 Claims, 2 Drawing Sheets

HIGH-PRESSURE DISCHARGE LAMP OPERATING CIRCUIT

BACKGROUND OF THE INVENTION

This invention relates to a high-pressure discharge lamp operating circuit, and more particularly to a high-pressure discharge lamp operating circuit wherein a low-frequency AC operation s transferred to a high frequency operation or a DC operation after arc spots have been located at their normal position (i.e. tips of electrodes) at an early stage of operation.

In high-pressure discharge lamps used in the scientific instruments for the field of measurement, it is preferred that no fluctuation or ripple is present in the light output. To this end, the discharge lamps are frequently operated on a high-frequency power source or DC power source. In this case, in order to produce the arc spots at their normal position which are the tips of electrodes, a low-frequency AC operation was performed at an early stage of operation as disclosed in a co-pending U.S. patent application Ser. No. 603,431 filed on Apr. 24, 1984, now U.S. Pat. No. 4,587,460. When the high-pressure discharge lamp is properly operating, arc spots 2 are produced or formed at the tips of electrodes 1, respectively and a discharge plasma 3 is maintained therebetween in an arc tube as shown in FIG. 4A. Further, the shape of the arc spots, which was not considered in the above-referenced patent at all, is such that the arc spots 2, if formed properly, cover the entire tips of the electrodes 1, respectively as shown in FIG. 4B. In this proper state, the discharge plasma 3 is stable. However, it was found that there is a case wherein minute arc spots 2' are formed on portions of the tips of the electrodes 1, as shown in FIG. 4C. The minute arc spots 2' move around on the tips of the electrodes 1, which causes the discharge plasma 3' also to move, resulting in the fluctuation in the light output.

This fluctuation of the light output is a fatal defect when the high-pressure discharge lamp is to be used in the field of measurement, and accordingly, some means for obviating this defect is required.

SUMMARY OF THE INVENTION

An object of this invention is to provide a high-pressure discharge lamp operating circuit which can produce a highly stabilized light output without movement in the arc spots and the discharge plasma.

To achieve this object, in accordance with one aspect of this invention, in a high-pressure discharge lamp operating circuit which performs a low-frequency AC operation at an early stage of operation and, in the steady-state of operation, performs a high-frequency AC operation or DC operation, there is provided means for effecting a transition from the low-frequency AC operation to the high-frequency AC operation or DC operation either at the time which is a predetermined time period after the ignition of discharge before the lamp reaches the steady-state, or after having detected at least one of predetermined lamp characteristics such as a lamp voltage, light intensity, etc. whereby a stabilized light output can be obtained.

DESCRIPTION OF PREFERRED EMBODIMENTS

First, the operating theory of this invention will be explained.

Figure 4A:
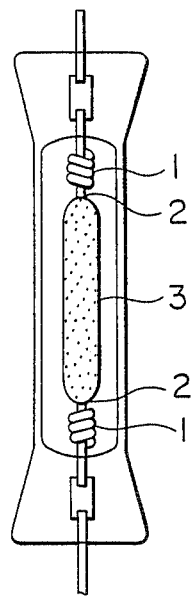
FIGS. 4A to 4C are schematic illustrations showing an arc tube for the high-pressure discharge lamp, shape of a normal arc spot in the tube, and shape of a minute arc spot providing an unstable light output, respectively.
Figure 4B:
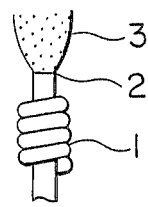
Figure 4C:
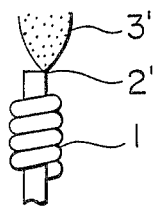

High-pressure discharge lamps, such as a metal halide lamp, generally require a certain time, typically 2-3 minutes, for the temperature in an arc tube to increase after the ignition of discharge so that the filler provides the pressure of a predetermined value. The present inventors carefully studied the shapes of the arc spots after the arc spots formed through a low-frequency operation had moved to the tips of electrodes. As a result, the following facts were found. First, at an early stage of the low-frequency operation, or more particularly, for a period lasting typically 7 to 8 seconds commencing at about 2 to 3 seconds after the ignition of discharge, the arc spot always assumes a spread shape which is the normal or proper shape. Secondly, when the low-frequency AC operation is further sustained, for a period lasting typically about 1 minute commencing at about 2 minutes after ignition, the temperature in the arc tube continues to increase so that the pressure of the filler is enhanced, which means that the arc tube approaches the steady-state of operation. In this state, the arc spot takes a minute shape as shown in FIG. 4C, thereby providing an unstable light output. Thirdly, when the transition from the low-frequency AC operation to a DC operation or high-frequency operation is effected while the arc spot assumes the spread or normal shape, the normal arc spot shape is maintained. Thus, as understood from the above facts, it is important to the low-frequency AC operation before the pressure of the filler becomes high, i.e., before the arc tube reaches the steady-state of operation. Constructing the operating circuit so as to have such a mechanism permits the normal arc spot shape to be maintained, thereby providing a stabilized light output. Specifically, the present high-pressure discharge lamp operating circuit which performs a low-frequency AC operation at an early stage of operation and thereafter performs a high-frequency AC operation or DC operation during the steady-state of operation, is provided with means for effecting the transition from the low-frequency AC operation to the high-frequency AC operation or DC operation either at the time which is after a predetermined time after the ignition of discharge before the high pressure discharge lamp reaches the steady-state, or after having detected at least one of a number of predetermined lamp characteristics, whereby a stabilized light output can be obtained.

Figure 1:
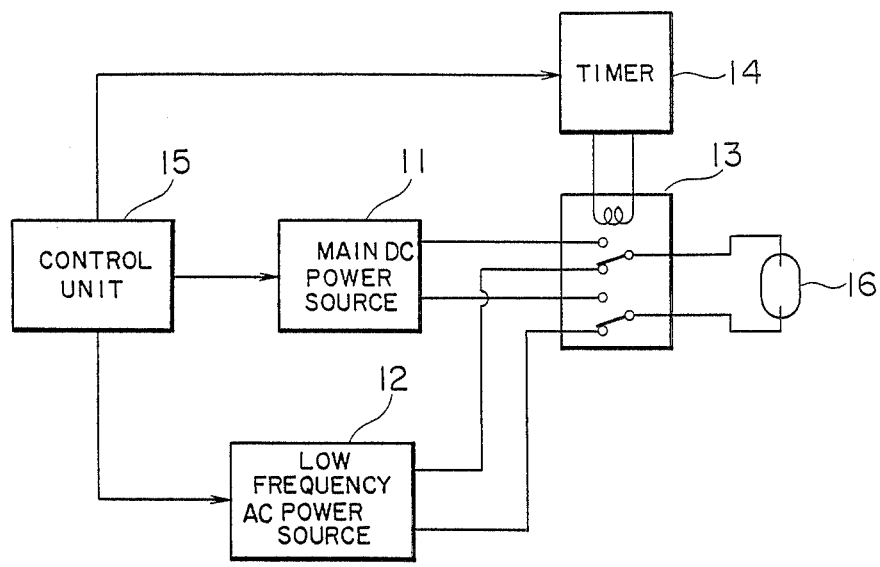
FIGS. 1 to 3 are block diagrams showing the arrangements of high-pressure discharge lamp operating circuits according to first, second and third embodiments of this invention, respectively.
Figure 2:
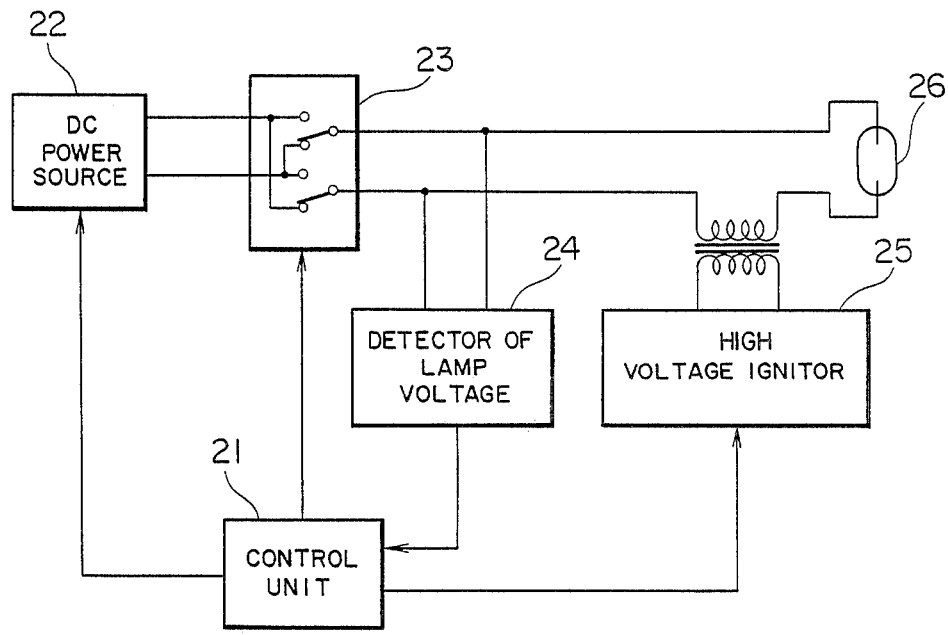
Figure 3:
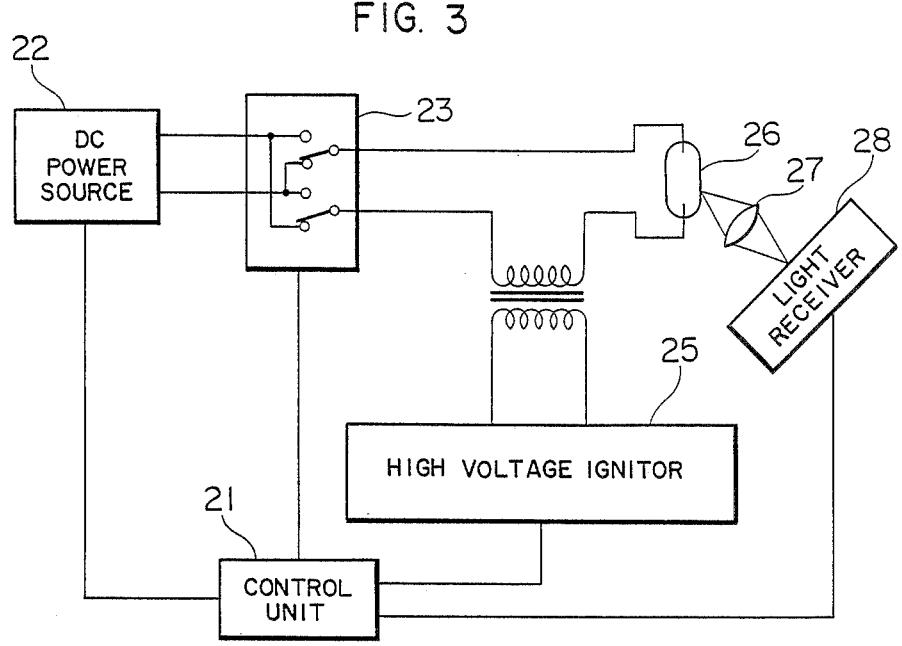

Several embodiments of this invention will be explained with reference to the drawings. FIGS. 1–3 show the arrangements of high-pressure discharge lamp operating circuits according to first, second and third embodiments of this invention.

The arrangement according to the first embodiment of this invention, as shown in FIG. 1, comprises a main DC power source unit 11, a low frequency AC power source unit 12 having a frequency not exceeding 1 KH$_z$ such as a commercial power-frequency, a relay 13, a timer 14 for actuating the relay 13 at a predetermined time, and a control unit 15 for controlling the main DC power source unit 11, the low-frequency AC power source unit 12 and the timer 14 so as to place them in their operating state. The main DC power source unit 11 generally consists of a DC power source and a current limiting circuit, preferably a current regulating circuit. Numeral 16 designates an arc tube of the metal halide lamp.

The above high-pressure discharge lamp operating circuit operates as follows. First, the control unit 15 places the main DC power source unit 11, the low-frequency AC power source unit 12 and the timer 14 in their operating state. Next, a high-voltage generator which is a discharge ignition unit in the low-frequency AC power source unit 12 produces a high voltage to ignite the arc tube 16 of the metal halide lamp and the low-frequency AC power source unit 12 performs a low frequency AC discharge. During the above period, which typically lasts about 7 to 8 seconds about 2 or 3 seconds after the ignition of discharge, the arc spots come to be produced at the normal positions i.e. over the entire tip areas of the electrodes. Thereafter, the timer 14 actuates the relay 13 to effect the transition from the power source 12 to the main DC power source unit 11 so that the current flows from the latter. In the high-pressure discharge lamps having a common filler and a common shape of the arc tube, it generally requires the same fixed time for the filler to reach a predetermined pressure so that the arc tube reaches the steady-state of operation. This timer 14 is set at a time shorter than this fixed time. According to this embodiment, the arc spots produced have normal shapes at the normal positions so that a stabilized discharge is provided. Particularly, in the application to the light source for measurement, the light output can be extremely stablized. Further, although the discharge ignition unit is provided in the low-frequency AC power source unit 12, it may be alternatively provided in the main DC power source unit. In this case, the relay 13 first connects the main DC power source unit 11 with the arc tube 16 of the metal halide lamp, and then connects the low-frequency AC power source unit with the arc tube after the discharge has been ignited. The subsequent operation proceeds in the same manner as mentioned above. Instead of the relay 14, an appropriate electronic circuit may be used.

In the second embodiment of this invention, the arrangement of which is illustrated in FIG. 2, first, a control unit 21 actuates a DC power source unit 22 and a high voltage generator 25 for discharge ignition. When an arc tube 26 of the metal halide lamp is ignited, a polarity changing circuit 23 is operated with a fixed frequency, e.g., frequency not exceeding 1 kHz such as the commercial power-frequency, by the signal supplied from the control unit 21 so that the arc tube 26 is discharged by the low-frequency AC operation. Thus, the arc spots are produced at their normal positions. After the discharge ignition, the lamp voltage of the arc tube gradually increases as the filler in the arc tube 26 evaporates, and reaches a steady-state lamp voltage when about 2 to 3 minutes, typically, have passed since the discharge ignition. When a lamp voltage detector 24 detects that the lamp voltage has reached a fixed voltage lower than the steady-state lamp voltage, the operation of the polarity changing circuit 23 is stopped by the control unit 21. Thereafter, the arc tube 26 is kept in the operating state wherein a stabilized light output is continuously provided from the arc tube 26 powered by the DC power source.

In the third embodiment of this invention, the arrangement of which is illustrated in FIG. 3, first, the control unit 21 actuates the DC power source unit 22 and the high voltage ignitor 25 for discharge ignition. When the arc tube 26 of the metal halide lamp is ignited, the polarity changing circuit 23 is operated with a fixed frequency, e.g., frequency not exceeding 1 kHz such as the commercial power frequency, by the signal supplied from the control unit 21 so that the arc tube 26 is ignited by the low-frequency AC source. After the discharge ignition, since light is emitted while the filler in the arc tube 26 evaporates, the intensity of the emitted light is gradually strengthened and will reach the steady-state light intensity when 2-3 minutes have passed since discharge ignition. The light intensity of the arc tube 26 is monitored by a light receiver 28 such as a photo-diode through a lens 27. When the light receiver 28 detects that the light intensity has reached a fixed intensity lower than the steady-state light intensity, a signal is supplied to the control unit 21 and the subsequent operation of the polarity changing circuit 23 is stopped by the control unit 21. Thus, the arc tube 26 is maintained in an operating state wherein a stabilized light output is produced, with the arc spots taking normal shapes at their normal positions.

In each embodiment of this invention, the stopping of the low-frequency AC operation is performed while the arc spot has a spread, normal shape which extends over an entire tip of each electrode so that the discharge plasma does not move in its position, providing a continued stabilized light output. Further, in addition to the above embodiments, it is also possible to monitor the temperature in the arc tube so that, when the monitored temperature of the arc tube has reached a predetermined temperature lower than the steady-state temperature of the arc tube, the low-frequency AC operation is stopped and transferred to the DC operation.

The gist of this invention is to perform a low-frequency AC operation at an early stage of operation of a high-pressure discharge lamp and to stop the low-frequency AC operation while the arc spots have normal shapes. Therefore, the subsequent operating manner is not restricted to a DC operation of constant current driving, but a pulse operation or a high-frequency AC operation using preferably the frequency over 10 kHz, for example, is also possible.

As explained above, in accordance with this invention, in a high-pressure discharge lamp operating circuit for performing a low-frequency AC operation at an early stage of operation and performing a high-frequency AC operation or DC operation in the steady-state of operation, there is provided means for effecting a transition from the low-frequency AC operation to a high-frequency AC operation or DC operation either at the time which is after a predetermined time period after ignition of discharge before the high-pressure discharge lamp reaches the steady-state, or after having detected at least one of predetermined lamp characteristics, so that the arc spots always assume the normal shape at their normal position, to thereby attain an operating state wherein a stabilized light output is produced. Accordingly, the reliability of a high-pressure discharge lamp such as a metal halide lamp is improved and the performance of measuring instruments equipped with such a light source is also improved.

We claim:

1. A high-pressure discharge lamp operating circuit comprising:
   discharge ignition means for igniting a discharge between main electrodes of an arc tube;
   first power supply means for supplying low-frequency AC power to the arc tube for placing an arc spot on a tip of each of said main electrodes;
   second power supply means for supplying to said arc tube a DC power or an high-frequency AC power;
   power switching means for switching the power to be supplied to the arc tube from said first power supply means to said second power supply means after said arc spot has been placed with full contact on the tip of each of the main electrodes and before the arc spot changes to minute contact on the tip of the main electrodes; and
   control means for controlling said discharge ignition means, said first and second power supply means, and said power switching means, including detecting means for detecting a condition which occurs prior to steady-state operation of said arc tube, said power switching means being operated by an output signal from said detecting means upon detecting said condition.

2. A high-pressure discharge lamp operating circuit according to claim 1, wherein said detecting means comprises a timer, and said power switching switch means comprises a relay.

3. A high-pressure discharge lamp operating circuit according to claim 1, wherein said detecting means comprises a lamp voltage detector, and said power switching means comprises a polarity changing circuit.

4. A high-pressure discharge lamp operating circuit according to claim 1, wherein said detecting means comprises a light intensity monitoring device, and said power switching means comprises a polarity changing circuit.

5. A high-pressure discharge lamp operating circuit according to claim 1, wherein said detecting means comprises a timer.

6. A high-pressure discharge lamp operating circuit according to claim 1, wherein said detecting means comprises a lamp voltage detector.

7. A high-pressure discharge lamp operating circuit according to claim 1, wherein said detecting means comprises a light intensity monitoring device.

8. A high-pressure discharge lamp operating circuit, comprising:
   discharge ignition means for igniting a discharge between main electrodes of an arc tube;
   first power supply means for supplying low-frequency AC power to the arc tube for placing an arc spot on the desired position of each of said main electrodes after said arc tube has been ignited;
   second power supply means for supplying a DC power or a high-frequency AC power to said arc tube;
   power switching means for selectively connecting said first power supply means or said second power supply means to said arc tube; and
   control means for controlling said power switching means to connect said first power supply means to said arc tube after said arc tube has been ignited and until said arc spot has been placed with full contact on a desired position of each of said main electrodes and to disconnect said first power supply means and connect said second power supply means to said arc tube before the arc spot changes to minute contact on the tip of the main electrodes, including detecting means for detecting a condition which occurs prior to steady-state operation of said arc tube, said power switching means being operated by an output signal from said detecting means upon detecting said condition.

9. A high-pressure discharge lamp operating circuit according to claim 8, wherein said detecting means comprises a timer.

10. A high-pressure discharge lamp operating circuit according to claim 8, wherein said detecting means comprises a lamp voltage detector.

11. A high-pressure discharge lamp operating circuit according to claim 8, wherein said detecting means comprises a light intensity monitoring device.

12. A method of operating a high-pressure discharge lamp in the form of an arc tube having main electrodes between which a discharge is established, comprising the steps of:
   igniting a discharge between the main electrodes of said arc tube;
   supplying low-frequency AC power to the arc tube for placing an arc spot on a desired position of each of the main electrodes thereof after the arc tube has been ignited; and
   switching the power supplied to the arc tube from said low-frequency AC power to a DC power or a high-frequency AC power after said arc spot has been placed with full contact on the desired position of each of the main electrode and before the arc spot changes to minute contact on the tip of the main electrodes, detecting a condition which occurs prior to steady-state operation of said arc tube, and disconnecting said low-frequency AC power from said arc tube while connecting said DC power or high-frequency AC power to said arc tube upon detecting said condition.

13. A method according to claim 12, wherein said detecting of a condition comprises detecting the light intensity of the arc tube.

14. A method according to claim 12, wherein said detecting of a condition comprises detecting the lamp voltage of the arc tube.

15. A method according to claim 12, wherein said detecting of a condition comprises detecting when a predetermined time expires after ignition of the discharge.

* * * * *